United States Patent
Li et al.

(10) Patent No.: US 8,462,390 B2
(45) Date of Patent: Jun. 11, 2013

(54) IMAGE PROCESSING METHOD AND APPARATUS

(75) Inventors: Haifeng Li, Beijing (CN); Shixiong Ma, Beijing (CN); Bin Yang, Beijing (CN); Lidong Wang, Beijing (CN)

(73) Assignees: Peking University Founder Group Co., Ltd., Beijing (CN); Peking University, Beijing (CN); Beijing Founder Electronics Co., Ltd., Beijing (CN)

( * ) Notice: Subject to any disclaimer, the term of this patent is extended or adjusted under 35 U.S.C. 154(b) by 147 days.

(21) Appl. No.: 13/124,708

(22) PCT Filed: Oct. 19, 2009

(86) PCT No.: PCT/CN2009/001157
§ 371 (c)(1),
(2), (4) Date: Aug. 4, 2011

(87) PCT Pub. No.: WO2010/043119
PCT Pub. Date: Apr. 22, 2010

(65) Prior Publication Data
US 2011/0279872 A1    Nov. 17, 2011

(30) Foreign Application Priority Data
Oct. 17, 2008    (CN) .......................... 2008 1 0224335

(51) Int. Cl.
*H04N 1/52* (2006.01)
(52) U.S. Cl.
USPC ........ 358/3.19; 358/3.13; 358/3.07; 358/3.06
(58) Field of Classification Search
USPC .......................................................... 358/1.9
See application file for complete search history.

(56) References Cited

U.S. PATENT DOCUMENTS

| | | | |
|---|---|---|---|
| 8,045,233 B2 * | 10/2011 | Li et al. | 358/3.06 |
| 2008/0278765 A1 * | 11/2008 | Li et al. | 358/3.16 |
| 2008/0285085 A1 | 11/2008 | Li et al. | |
| 2009/0034006 A1 * | 2/2009 | Blondal et al. | 358/3.13 |

FOREIGN PATENT DOCUMENTS

| | | |
|---|---|---|
| CN | 1767586 A | 5/2006 |
| CN | 1774029 A | 5/2006 |
| CN | 1913574 A | 2/2007 |
| CN | 101404714 A | 4/2009 |

* cited by examiner

*Primary Examiner* — Vincent Rudolph
*Assistant Examiner* — Richa Mishra
(74) *Attorney, Agent, or Firm* — The Webb Law Firm

(57) ABSTRACT

An image processing method includes: generating a stochastic screening dither matrix (S101); performing a centered positive-negative conversion operation on the stochastic screening dither matrix (S102); generating a screen dot dither contrast matrix for each color surface according to the stochastic screening dither matrix after being subjected to the positive-negative conversion operation and a stochastic screening dither threshold set for each color surface of an image; performing a logical "and" operation between each data item in a one-bit amplitude modulation screen dot matrix of each color surface of the image and a data item at a corresponding position in the screen dot dither contrast matrix of the color surface, and using a result as a processed value of a corresponding data item in the one-bit amplitude modulation screen dot matrix of the color surface. An apparatus corresponding to the image processing method is also provided. According to the above-described image processing method and apparatus, the problem in the prior art of an excess of pure-color pixels existing in an original one-bit dot matrix can be resolved.

10 Claims, 4 Drawing Sheets

IMAGE PROCESSING METHOD AND APPARATUS

FIELD OF THE PRESENT INVENTION

The present invention relates to a field of image hard copy in the image processing technology, particularly to a halftone image processing method and apparatus applied to printer screening plate-making technology.

BACKGROUND OF THE PRESENT INVENTION

Image hard copy mainly relates to screening plate-making technology for a printer and a top-grade plate-making apparatus for printing. Screening technology used for image hard copy is referred to as digital image halftone technology as well. The digital image halftone technology may be classified into two categories, which are amplitude modulation screening and frequency modulation screening respectively. The amplitude modulation screening is referred to as clustered-dot ordered dithering technology as well, characterized in that two geometrically neighboring dyeing dots in a halftone image generated are clustered, thereby forming tufts of dyeing regions, which are called screen dots as well. Because the clustered-dot ordered dithering technology adopts a method of controlling a screen dot area to reproduce grays of an original image, these screen dots are referred to as amplitude modulation screen dots.

Nowadays, in traditional printing technology, the most versatile and widely used technology is amplitude modulation halftone based digital screening technology, and the output amplitude modulation screen dots have different screen dot sizes and arrangement angles, i.e., so-called screen meshes and screen angles, according to an actual use requirement. The screen dot sizes and screen meshes decide clustering degree of screen dots in a one-bit dot matrix, and in theory, the larger the number of screen meshes is, the smaller the screen dot size is; the smaller the number of screen meshes is, the larger the screen dot size is. In terms of a traditional printing output device, the output device generally has a higher accuracy-resolution, which is generally 2400 dpi or more, in order to guarantee output quality of printing and avoid a hierarchical tone sharpening problem based on a one-bit apparatus.

Compared with the traditional printing, new digital printing modes such as digital printing or the like appear in recent years, and have an operating feature very similar to an originally existing desktop publishing system based on printer output. The aims of the digital printing are output quality at a high resolution of the traditional printing and an effect of precise-reproduction of colors. Meanwhile, in connection with emergence of process idea, the demand for the digital printing to be compatible with the one-bit dot matrix output from the traditional printing also gradually emerges, thereby achieving seamless connection between the digital printing and the traditional printing finally.

The digital printing differs from the traditional printing mainly in imaging mode and output precision. Its device imaging mode is mostly ink-jet imaging or carbon powder imaging by a laser, and has an essential difference from color generation based on halftone screen dots in the traditional printing. Meanwhile, the output precision of the digital printing device belongs to low precision output in terms of efficiency, cost and the like, and 300 dpi, 600 dpi, 720 dpi and the like are generally used.

At present, as the digital printing combines with the traditional printing more and more tightly, an image processed by the digital printing not only includes a common eight-bit image, but also increasingly presents a one-bit dot matrix at a high resolution. This brings many technology processing problems, which embody mainly in: how to smoothly convert a one-bit dot matrix at a high resolution to an eight-bit image at a low resolution; how to obtain a converted eight-bit image with information about screen dots, which is easy for the digital printing to make color correction on; and the like. Wherein, the problem of how to obtain a converted eight-bit image with information about screen dots, which is easy for the digital printing to make color correction on, increasingly becomes an insurmountable obstacle in the digital printing process.

In accordance with the above-described problems, they mainly embody in that an eight-bit image, obtained after a one-bit amplitude modulation screen dot image at a high resolution is subjected to conversion for reducing resolution and smoothing processing, is not an eight-bit continuous-tone image in a full sense, chiefly because the converted eight-bit image has information about screen dots in the original one-bit dot matrix, which mainly embodies in screen dots clustered by a plurality of pure-color blocks, and an excess of the amount of values of pure-color pixels in the original one-bit dot matrix destroys tone continuity of an ideal eight-bit image, and seriously hinders subsequent color calibration based on an eight-bit continuous-tone image.

SUMMARY OF THE PRESENT INVENTION

The invention provides an image processing method and apparatus, in order to resolve the problem of an excess of the amount of values of pure-color pixels existing in an original one-bit dot matrix in the prior screening plate-making technology.

An embodiment of the invention provides an image processing method applied to printer screening plate-making technology, which includes:

generating a stochastic screening dither matrix T; a value of each data item i in the stochastic screening dither matrix T being $t_i$, and $t_i \in [0,255]$, $i \in [0, W_T-1]$, wherein $W_T$ is the number of data items in the stochastic screening dither matrix T;

subtracting a positive-negative conversion factor $\delta$ from the value $t_i$ of each data item i in the stochastic screening dither matrix T, to obtain a difference value $rt_i$ corresponding to each data item i, and $\delta \in [0,255]$; replacing the original value $t_i$ of each data item i with the difference value $rt_i$;

generating a screen dot dither contrast matrix $CT_j$ for each color surface of n color surfaces of an image according to the difference value $rt_i$ and a stochastic screening dither threshold $F_j$ set for each color surface, wherein $F_j \in [0,127]$, $j \in [1,n]$; and performing a logical "and" operation between each data item in a one-bit amplitude modulation screen dot matrix of each color surface of the image and a data item at a corresponding position in the screen dot dither contrast matrix $CT_j$ of the color surface respectively, and replacing a value of a corresponding data item in the one-bit amplitude modulation screen dot matrix with a resultant value of the logical "and" operation, to obtain a processed one-bit amplitude modulation screen dot matrix of each color surface of the image.

The stochastic screening dither matrix T is a square matrix with a side length of L.

The difference of a value of each data item in the stochastic screening dither matrix T from that of its neighboring data item is relatively great.

The step of generating the stochastic screening dither matrix T includes:

using a formula $T=(a \times u + b \times v) \bmod(c)$ to generate the stochastic screening dither matrix T, wherein, u and v denote a coordinate in horizontal direction and a coordinate in vertical direction of a respective data item located in the stochastic screening dither matrix T, respectively;

parameters a, b and c are three positive integers which are prime to each other, and take values satisfying the corresponding $t_i \in [0,255]$, wherein $i = v \times L + u$.

the parameters a, b and c are obtained by using a formula $Tr_n = Tr_{n-1} + Tr_{n-2} + Tr_{n-3}(n>2)$, wherein $Tr_0 = 0$, $Tr_1 = 1$, $Tr_2 = 1$.

The step of generating the screen dot dither contrast matrix $CT_j$ for each color surface of the n color surfaces of the image according to the difference value $rt_i$ and the stochastic screening dither threshold $F_j$ set for each color surface includes:

for each color surface j of the image, if the replaced value $rt_i$ of the data item i in the stochastic screening dither matrix T satisfies $rt_i < 0$ and $(rt_i + \delta) < F_j$, setting a value of a data item at a corresponding position in the screen dot dither contrast matrix $CT_j$ to be 1, otherwise setting the value of the data item at the corresponding position in the screen dot dither contrast matrix $CT_j$ to be 0.

The step of performing the logical "and" operation between each data item in the one-bit amplitude modulation screen dot matrix of each color surface of the image and the data item at the corresponding position in the screen dot dither contrast matrix $CT_j$ of the color surface includes:

for each color surface j, tiling the screen dot dither contrast matrix $CT_j$ of the color surface one by one, so that length and width of a tiled matrix $SCT_j$ obtained after being tiled are larger than those of the one-bit amplitude modulation screen dot matrix of the color surface, respectively;

selecting an arbitrary part with a length and a width equivalent to those of the one-bit amplitude modulation screen dot matrix from the tiled matrix $SCT_j$ as a contrast matrix $CSCT_j$; and performing a logical "and" operation between each data item in the one-bit amplitude modulation screen dot matrix and a data item at a corresponding position in the contrast matrix $CSCT_j$.

An embodiment of the invention also provides an image processing apparatus applied to printer screening plate-making technology, which includes:

a first matrix generating unit, used for generating a stochastic screening dither matrix T; a value of each data item i in the stochastic screening dither matrix T being $t_i$, and $t_i \in [0,255]$, $i \in [0, W_T - 1]$, wherein $W_T$ is the number of data items in the stochastic screening dither matrix T;

a conversion unit, used for subtracting $\delta$ from the value $t_i$ of each data item i in the stochastic screening dither matrix T, to obtain a difference value $rt_i$ corresponding to each data item i, and $\delta \in [0,255]$, and replacing the original value $t_i$ of each data item i with the difference value $rt_i$;

a threshold setting unit, used for setting a stochastic screening dither threshold $F_j$ for each color surface of n color surfaces of an image, and $F_j \in [0,127]$, $j \in [1,n]$;

a second matrix generating unit, used for generating a screen dot dither contrast matrix $CT_j$ for each color surface according to the $F_j$ and the replaced value $rt_i$;

a processing unit, used for performing a logical "and" operation between each data item in a one-bit amplitude modulation screen dot matrix of each color surface of the image and a data item at a corresponding position in the screen dot dither contrast matrix $CT_j$ of the color surface respectively, and replacing a value of a corresponding data item in the one-bit amplitude modulation screen dot matrix with a resultant value of the logical "and" operation, to obtain a processed one-bit amplitude modulation screen dot matrix for each color surface of the image.

The first matrix generating unit includes:

a matrix generating subunit, used for using a formula $T = (a \times u + b \times v) \mod(c)$ to generate the stochastic screening dither matrix T, wherein, u and v denote a coordinate in horizontal direction and a coordinate in vertical direction of a respective data item located in the stochastic screening dither matrix T, respectively; parameters a, b and c are three positive integers which are prime to each other, and take values satisfying the corresponding $t_i \in [0,255]$, wherein $i = v \times L + u$, and L is a side length of the stochastic screening dither matrix T; and a parameter calculation subunit, used for using a formula $Tr_n = Tr_{n-1} + Tr_{n-2} + Tr_{n-3}(n>2)$ to calculate to obtain the parameters a, b and c, wherein $Tr_0 = 0$, $Tr_1 = 1$, $Tr_2 = 1$.

The processing unit includes:

a tiling subunit, used for tiling the screen dot dither contrast matrix $CT_j$ of a color surface one by one, so that length and width of a tiled matrix $SCT_j$ obtained after being tiled are larger than those of the one-bit amplitude modulation screen dot matrix of the color surface, respectively;

a selection subunit, used for selecting an arbitrary part with a length and a width equivalent to those of the one-bit amplitude modulation screen dot matrix from the titled matrix $SCT_j$ as a contrast matrix $CSCT_j$; and a processing subunit, used for performing a logical "and" operation between each data item in the one-bit amplitude modulation screen dot matrix and a data item at a corresponding position in the contrast matrix $CSCT_j$, and replacing a value of a corresponding data item in the one-bit amplitude modulation screen dot matrix with a resultant value of the logical "and" operation.

The beneficial effects of the invention are as follows:

the image processing method and apparatus provided by the embodiments of the invention generate the stochastic screening dither matrix T, the value $t_i$ of each data item i in the matrix T being $t_i \in [0,255]$; subtract $\delta$ from the value $t_i$ of each data item i in the stochastic screening dither matrix T, to obtain the difference value $rt_i$ corresponding to each data item i, and $\delta \in [0,2555]$; set the stochastic screening dither threshold $F_j$ for each color surface of the n color surfaces of the image; generate the screen dot dither contrast matrix $CT_j$ for each color surface of the n color surfaces of the image according to the difference value $rt_i$ and the stochastic screening dither threshold $F_j$ set for each color surface; perform a logical "and" operation between each data item in the one-bit amplitude modulation screen dot matrix of each color surface of the image and the data item at the corresponding position in the screen dot dither contrast matrix $CT_j$ of the color surface respectively, and replace the value of the corresponding data item in the one-bit amplitude modulation screen dot matrix with the resultant value of the logical "and" operation. The image processing method and apparatus provided by the invention are used to set values of a part of data items with values of 1 in the original one-bit amplitude modulation screen dot matrix to be 0 randomly, thereby resolving the problem of an excess of the amount of values of pure-color pixels existing in the original one-bit dot matrix in the prior screening plate-making technology.

DETAILED DESCRIPTION OF THE PREFERRED EMBODIMENTS

An embodiment of the invention provides an image processing method including:

generating a stochastic screening dither matrix T; a value of each data item i in the matrix T being $t_i$, and $t_i \in [0,255]$, $i \in [0, W_T - 1]$, wherein $W_T$ is the number of data items in the stochastic screening dither matrix T;

subtracting $\delta$ from the value $t_i$ of each data item i in the matrix T, to obtain a difference value $rt_i$ corresponding to each data item i, and $\delta \in [0,255]$;

generating a screen dot dither contrast matrix $CT_j$ for each color surface of n color surfaces of an image according to the difference value $rt_i$ and a stochastic screening dither threshold $F_j$ set for each color surface; and performing a logical "and" operation between each data item in a one-bit amplitude modulation screen dot matrix of each color surface of the image and a data item at a corresponding position in the screen dot dither contrast matrix $CT_j$ of the color surface respectively, and replacing a value of a corresponding data item in the one-bit amplitude modulation screen dot matrix with a resultant value of the logical "and" operation.

The above-described method of the invention is described in detail in connection with the accompanying figures below.

Figure 1:
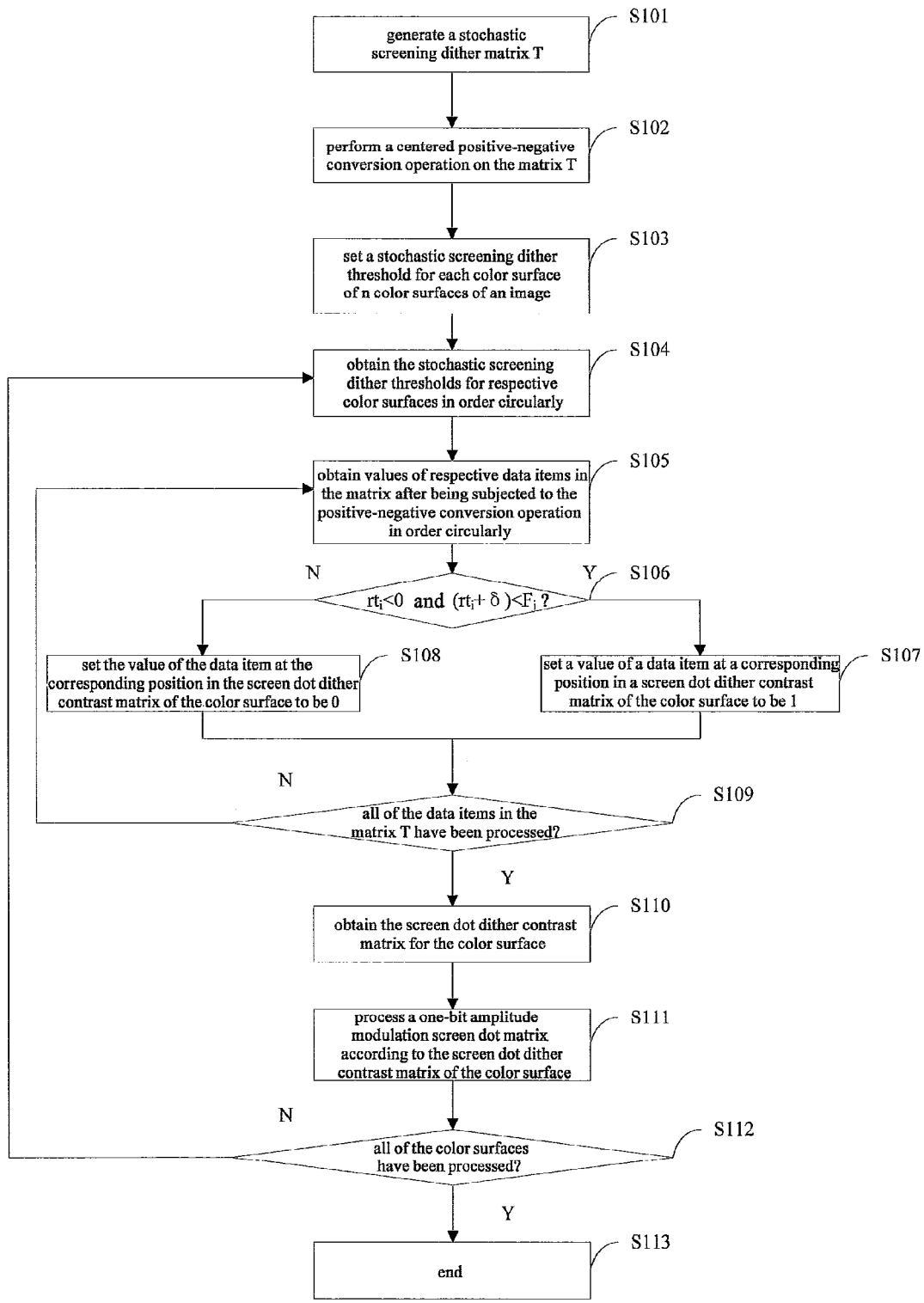
FIG. 1 is a flow chart illustrating an image processing method in an embodiment of the invention.

FIG. 1 illustrates a flow chart of the image processing method in the embodiment of the invention, including:

Step S101. Generate the stochastic screening dither matrix T by using a formula $T=(a \times u + b \times v) \mod(c)$ in the embodiment of the invention, wherein, a value of each data item i in the matrix T is $t_i$, and $t_i \in [0, 255]$, $i \in [0, W_T-1]$, $W_T$ is the number of data items in the matrix T;

a side length of the matrix T is L, then $W_T = L \times L$;

u and v denote a coordinate in horizontal direction and a coordinate in vertical direction of a respective data item located in the matrix T, respectively; and parameters a, b and c are three positive integers which are prime to each other, and take values satisfying the corresponding $t_i \in [0,255]$, wherein $i = v \times L + u$.

In particular, as the larger the side length L of the matrix T is, the higher the processing quality of the method is, but the lower the processing efficiency is, and in comprehensive consideration of the processing quality and the processing efficiency of the method, L=256 is a set in the embodiment of the invention.

In the embodiment of the invention, a formula $Tr_n = Tr_{n-1} + Tr_{n-2} + Tr_{n-3}$ (n>2) is used to obtain the parameters a, b and c, wherein $Tr_0 = 0$, $Tr_1 = 1$, $Tr_2 = 1$. $Tr_n$ is calculated, until it is satisfied that $Tr_n$, $Tr_{n-1}$ $Tr_{n-2}$ are prime to each other, and $a = Tr_{n-2}$, $b = Tr_{n-1}$, $c = Tr_n$ are set. In other embodiments, other methods also can be used to obtain the parameters a, b and c.

Values of a part of data items in the matrix T generated according to the above-described method are as shown in Table 1.

TABLE 1

| values of a part of data items in the matrix T | | | | | | | | | |
|---|---|---|---|---|---|---|---|---|---|
| 1 | 3 | 184 | 111 | 76 | 180 | 251 | 234 | 88 | 141 |
| 5 | 90 | 255 | 237 | 148 | 145 | 216 | 163 | 65 | 67 |
| 168 | 125 | 219 | 202 | 37 | 38 | 81 | 124 | 68 | 70 |
| 150 | 44 | 49 | 131 | 42 | 40 | 99 | 246 | 193 | 140 |
| 83 | 45 | 47 | 244 | 191 | 116 | 175 | 228 | 221 | 22 |
| 196 | 118 | 100 | 227 | 209 | 156 | 13 | 157 | 164 | 24 |
| 250 | 232 | 86 | 138 | 173 | 74 | 8 | 10 | 182 | 113 |
| 214 | 161 | 58 | 60 | 104 | 109 | 12 | 92 | 253 | 235 |
| 84 | 122 | 61 | 63 | 241 | 223 | 170 | 127 | 218 | 200 |
| 102 | 243 | 189 | 136 | 188 | 205 | 152 | 29 | 35 | 129 |

Step S102. The value $t_i$ of each data item i in the matrix T generated according to the above-described method is a non-negative number. To adapt to subsequent processing of the method, it is necessary to perform a centered positive-negative conversion operation on the value $t_i$ of each data item i in the matrix T. Set a conversion factor as $\delta$, and a specific operation is as follows: $rt_i = t_i - \delta$, $\delta \in [0,255]$, $rt_i$ is as converted value of each data item i in the matrix T, $rt_i \in [-\delta, 255-\delta]$.

The determination of the conversion factor $\delta$ decides the numbers of positive numbers and negative numbers in the matrix T after being subjected to the positive-negative conversion operation. In general, it is best when the number of the positive numbers is comparable to that of the negative numbers, therefore, $\delta = 127$ is set in the embodiment of the invention.

Values of the part of data items corresponding to Table 1 in the matrix T after being subjected to the positive-negative conversion operation are as shown in Table 2.

TABLE 2

| values of the part of data items in the matrix T after being subjected to the positive-negative conversion operation | | | | | | | | | |
|---|---|---|---|---|---|---|---|---|---|
| −126 | −124 | 57 | −16 | −51 | 53 | 124 | 107 | −39 | 14 |
| −122 | −34 | 128 | 110 | 21 | 18 | 89 | 36 | −62 | −60 |
| 41 | −2 | 92 | 75 | −90 | −89 | −46 | −3 | −59 | −57 |
| 23 | −83 | −78 | 4 | −85 | −87 | −28 | −119 | 66 | 13 |
| −44 | −82 | −80 | 117 | 64 | −11 | 48 | 53 | 84 | −105 |
| 69 | −9 | −27 | 100 | 82 | 29 | −114 | 30 | 37 | −103 |
| 123 | 105 | −41 | 11 | 46 | −53 | −119 | −117 | 55 | −14 |
| 87 | 34 | −69 | −67 | −23 | −18 | −115 | −35 | 126 | 108 |
| −43 | −5 | −66 | −64 | 114 | 96 | 43 | 0 | 91 | 73 |
| −25 | 116 | 62 | 9 | 61 | 78 | 25 | −98 | −92 | 2 |

Step S103. Set the stochastic screening dither threshold $F_j$ for each color surface of the n color surfaces of the image, and $F_j \in [0,127]$, $j \in [1,n]$.

The stochastic screening dither threshold $F_j$ decides the degree of stochastic dither to be added into data in the one-bit amplitude modulation screen dot matrix. The smaller $F_j$ is, the larger the degree of the stochastic dither to be added is. In the embodiment of the invention, n=1, $F_1 = 110$ is set. In other embodiments, other values can be selected.

There is no sequencing between this step and the above-described steps S101 and S102.

Step S104. Obtain the stochastic screening dither threshold $F_j$ for the current color surface j.

Step S105. Obtain the value $rt_i$ of the current data item i of the matrix T after being subjected to the positive-negative conversion operation.

Step S106. If $rt_i<0$ and $(rt_i+\delta)<F_j$, perform step S107 to set a value of a data item at a corresponding position in the screen dot dither contrast matrix $CT_j$ for the current color surface to be 1; otherwise, perform step S108 to set the value of the data item at the corresponding position in the screen dot dither contrast matrix $CT_j$ for the current color surface to be 0.

Step S109. Determine whether all of the data items in the matrix T after being subjected to the positive-negative conversion operation are subjected to processing of the step S106 or not. If not all of the data items are subjected to the processing of the step S106, proceed to step S105 to obtain a value $rt_{i+1}$ of next data item i+1 in the matrix T after being subjected to the positive-negative conversion operation. If all of the data items are subjected to the processing of the step S106, proceed to step S110.

Step S110. Obtain the screen dot dither contrast matrix $CT_j$ for the current color surface j according to the above-described method.

Values of a part of data items corresponding to Table 1 in the screen dot dither contrast matrix $CT_1$ obtained for color surface 1 in the embodiment of the invention are as shown in Table 3.

TABLE 3 values of the part of data items in the screen dot dither contrast matrix $CT_1$ for color surface 1

| 1 | 1 | 0 | 0 | 1 | 0 | 0 | 0 | 1 | 0 |
|---|---|---|---|---|---|---|---|---|---|
| 1 | 1 | 0 | 0 | 0 | 0 | 0 | 0 | 1 | 1 |
| 0 | 0 | 0 | 0 | 1 | 1 | 1 | 0 | 1 | 1 |
| 0 | 1 | 1 | 0 | 1 | 1 | 1 | 0 | 0 | 0 |
| 1 | 1 | 1 | 0 | 0 | 0 | 0 | 0 | 0 | 1 |
| 0 | 0 | 1 | 0 | 0 | 0 | 1 | 0 | 0 | 1 |
| 0 | 0 | 1 | 0 | 0 | 1 | 1 | 1 | 0 | 0 |
| 0 | 0 | 1 | 1 | 1 | 1 | 1 | 1 | 0 | 0 |
| 1 | 0 | 1 | 1 | 0 | 0 | 0 | 0 | 0 | 0 |
| 1 | 0 | 0 | 0 | 0 | 0 | 0 | 1 | 1 | 0 |

Figure 2:
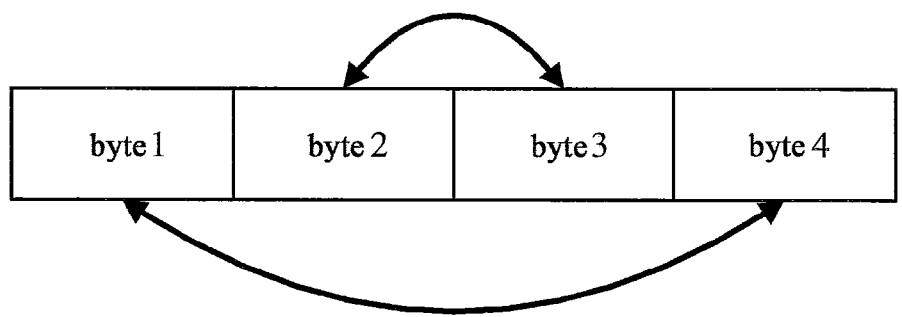
FIG. 2 is a schematic diagram illustrating a rule of reverse operation on the data byte in a screen dot dither contrast matrix in the embodiment of the invention.

Because an arrangement pattern of data bytes in the above-described screen dot dither contrast matrix $CT_j$ is consistent with that in an output apparatus, but is reversed to a storage operation in a computer, it is necessary to perform an operation of byte reverse. An operation rule in the embodiment of the invention is as follows and as shown in FIG. 2:

taking every four bytes as one processing unit in order; and
reversing storage orders of the four bytes in the computer in order in units of byte, that is, byte 1, byte 2, byte 3 and byte 4 are reversed to byte 4, byte 3, byte 2 and byte 1.

Step S111. Process the one-bit amplitude modulation screen dot matrix of the current color surface according to the screen dot dither contrast matrix of the current color surface, as shown in FIG. 3.

Figure 3:
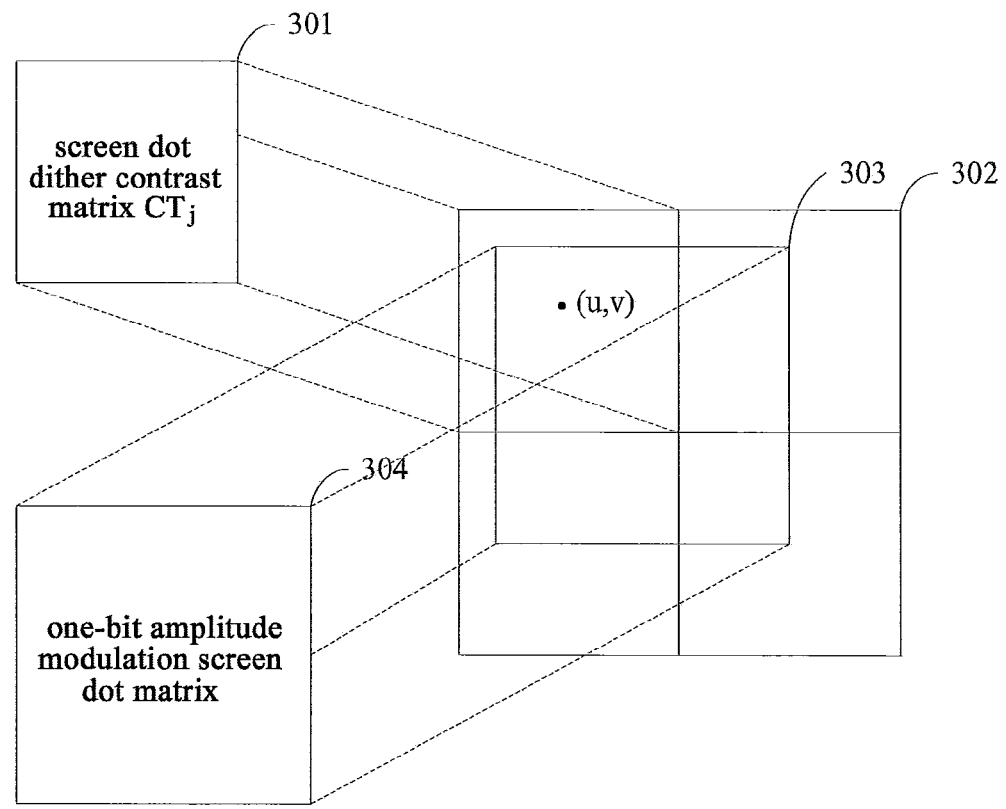
FIG. 3 is a schematic diagram illustrating an operation between the screen dot dither contrast matrix and a one-bit amplitude modulation screen dot matrix in the embodiment of the invention.

The screen dot dither contrast matrix $CT_j$ 301 of the current color surface is tiled one by one, so that length and width of a tiled matrix $SCT_j$ 302 (consisting of four screen dot dither contrast matrixes $CT_j$ 301 in FIG. 3) obtained after being tiled are larger than those of the one-bit amplitude modulation screen dot matrix 304 of the current color surface, respectively. A part with a length and a width equivalent to those of the one-bit amplitude modulation screen dot matrix is selected from the tiled matrix $SCT_j$ 302 as a contrast matrix $CSCT_j$ 303. A logical "and" operation is performed between each data item in the one-bit amplitude modulation screen dot matrix 304 and a data item at a corresponding position in the contrast matrix $CSCT_j$ 303, and a value of a data item at a corresponding position in the one-bit amplitude modulation screen dot matrix 304 is replaced with a result of the logical "and" operation, that is, values of the part of data items with values of 1 in the original one-bit amplitude modulation screen dot matrix are set to be 0.

Step S112. Determine whether all of the color surfaces are subjected to processing of the steps S104-S111 or not. If not all of the color surfaces are subjected to the processing of the steps S104-S111, proceed to the step S104 to obtain the stochastic screening dither threshold $F_{j+1}$ of next color surface j+1. If all of the color surfaces are subjected to the processing of steps S104-S111, proceed to step S113 to end processing steps.

Figure 4:
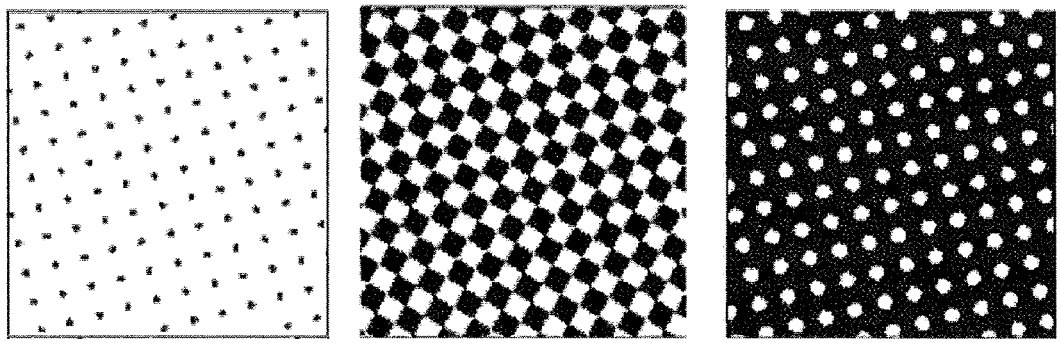
FIG. 4 is an effect diagram after processed by amplitude modulation screens at different levels in the embodiment of the invention.

An effect diagram of the data in the one-bit amplitude modulation screen dot matrix at different levels processed by the above-described image processing method is as shown in FIG. 4, which includes effect diagrams for amplitude modulation screen at three levels of 10%, 50% and 70% respectively. It can be seen that there are a plurality of white pixel points in a black pixel block.

Figure 5:
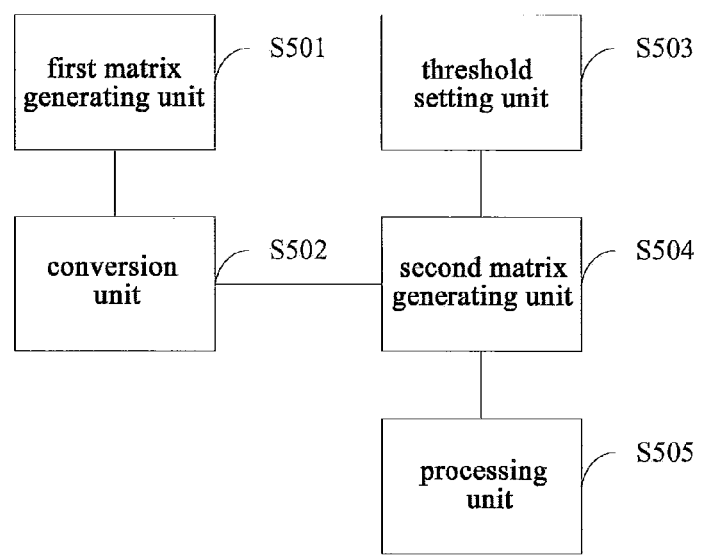
FIG. 5 is a schematic diagram illustrating a structure of an image processing apparatus in an embodiment of the invention.

Based on the same inventive concept, an embodiment of the invention also accordingly provides an image processing apparatus in accordance with the image processing method provided by the above-described embodiment of the invention. A schematic diagram of a structure of the apparatus is as shown in FIG. 5, and the structure particularly includes:

A first matrix generating unit S501, used for generating a stochastic screening dither matrix T; a value of each data item i in the stochastic screening dither matrix T being $t_i$, and $t_i\in[0,255]$, $i\in[0,W_T-1]$, is the number of data items in the stochastic screening dither matrix T;

A conversion unit S502, used for subtracting $\delta$ from the value $t_i$ of each data item i in the stochastic screening dither matrix T, to obtain a difference value $rt_i$ corresponding to each data item i, and $\delta\in[0,255]$, and replacing the original value $t_i$ of each data item i with the difference value $rt_i$;

A threshold setting unit S503, used for setting a stochastic screening dither threshold $F_j$ for each color surface of n color surfaces of an image, and $F_j\in[0,127]$, $j\in[1,n]$;

A second matrix generating unit S504, used for generating a screen dot dither contrast matrix $CT_j$ for each color surface according to the stochastic screening dither threshold $F_j$ and the difference value $rt_i$; and A processing unit S505, used for performing a logical "and" operation between each data item in a one-bit amplitude modulation screen dot matrix of each color surface of the image and a data item at a corresponding position in the screen dot dither contrast matrix $CT_j$ of the color surface respectively, and replacing a value of a corresponding data item in the one-bit amplitude modulation screen dot matrix with a resultant value of the logical "and" operation, to obtain a processed one-bit amplitude modulation screen dot matrix for each color surface of the image.

Figure 6:
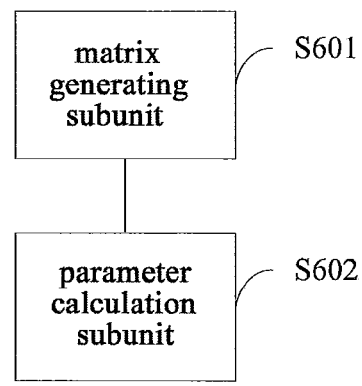
FIG. 6 is a schematic diagram illustrating a structure of a first matrix generating unit in the image processing apparatus in the embodiment of the invention.

The above-described first matrix generating unit S501 further includes as shown in FIG. 6:

a matrix generating subunit S601, used for using a formula $T=(a\times u+b\times v)\bmod(c)$ to generate the matrix T, wherein, u and v denote a coordinate in horizontal direction and a coordinate in vertical direction of a respective data item located in the stochastic screening dither matrix T, respectively; parameters a, b and c are three positive integers which are prime to each other, and take values satisfying the corresponding $t_i\in[0,255]$, wherein $i=v\times L+u$; and a parameter calculation subunit S602, used for using a formula $Tr_n=Tr_{n-1}+Tr_{n-3}(n>2)$ to obtain the parameters a, b and c, wherein $Tr_0=0$, $Tr_1=1$, $Tr_2=1$.

Figure 7:
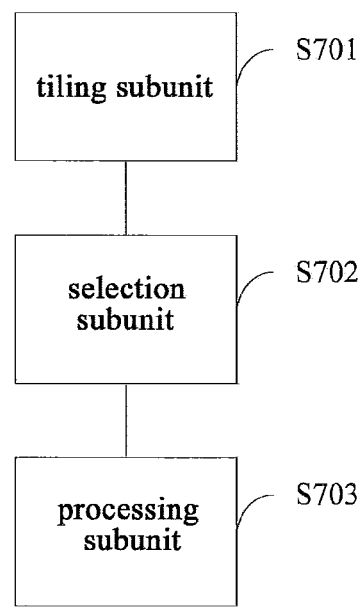
FIG. 7 is a schematic diagram illustrating a structure of a processing unit in the image processing apparatus in the embodiment of the invention.

The above-described processing unit S505 further includes as shown in FIG. 7:

a tiling subunit S701, used for tiling the screen dot dither contrast matrix $CT_j$ of each color surface one by one, so that length and width of a tiled matrix $SCT_j$ obtained after being tiled are larger than those of the one-bit amplitude modulation screen dot matrix of the color surface, respectively;

a selection subunit S702, used for selecting an arbitrary part with a length and a width equivalent to those of the one-bit amplitude modulation screen dot matrix from the tiled matrix $SCT_j$ a contrast matrix $CSCT_j$; and a processing subunit S703, used for performing a logical "and" operation between each data item in the one-bit amplitude modulation screen dot matrix and a data item at a corresponding position in the contrast matrix $CSCT_j$.

In conclusion, the solutions provided by the embodiments of the invention generate the screen dot dither contrast matrix of each color surface of the image according to the generated stochastic screening dither matrix and the stochastic screening dither threshold set for each color surface, and set values of a part of data items with values of 1 in the original one-bit amplitude modulation screen dot matrix to be 0 randomly by performing a logical "and" operation between each data item in the one-bit amplitude modulation screen dot matrix of each color surface and the data item at the corresponding position in the screen dot dither contrast matrix of the color surface, thereby resolving the problem of an excess of the amount of values of pure-color pixels existing in the original one-bit dot matrix in the prior screening plate-making technology.

It is apparent to those skilled in the art that various variations and modifications may be done without departing from spirits and scopes of the present invention. Thus, given that these variations and modifications made to the invention belong to the scope of the claims of the invention and equivalent thereof, these variations and modifications are intended to be encompassed within the invention.

The invention claimed is:

1. An image processing method applied to printer screening plate-making technology, characterized in that the method includes:
    generating a stochastic screening dither matrix T; a value of each data item i in the stochastic screening dither matrix T being $t_i$, and $t_i \in [0,255]$, $i \in [0, W_T-1]$, wherein $W_T$ is the number of data items in the stochastic screening dither matrix T;
    subtracting a positive-negative conversion factor $\delta$ from the value $t_i$ of each data item i in the stochastic screening dither matrix T, to obtain a difference value $rt_i$ corresponding to each data item i, and $\delta \in [0,255]$, and replacing the original value $t_i$ of each data item i with the difference value $rt_i$;
    generating a screen dot dither contrast matrix $CT_j$ for each color surface of n color surfaces of an image according to the difference value $rt_i$ and a stochastic screening dither threshold $F_j$ set for each color surface, wherein $F_j \in [0,127]$, $j \in [1,n]$; and
    performing a logical "and" operation between each data item in a one-bit amplitude modulation screen dot matrix of each color surface of the image and a data item at a corresponding position in the screen dot dither contrast matrix $CT_j$ of the color surface respectively, and replacing a value of a corresponding data item in the one-bit amplitude modulation screen dot matrix with a resultant value of the logical "and" operation, to obtain a processed one-bit amplitude modulation screen dot matrix for each color surface of the image.

2. The method according to claim 1, characterized in that the stochastic screening dither matrix T is a square matrix with a side length of L.

3. The method according to claim 2, characterized in that difference of a value of each data item in the stochastic screening dither matrix T from that of its neighboring data item is relatively large.

4. The method according to claim 3, characterized in that the step of generating the stochastic screening dither matrix T includes:
    using a formula $T=(a \times u + b \times v) \mod(c)$ to generate the stochastic screening dither matrix T, wherein,
    u and v denote a coordinate in horizontal direction and a coordinate in vertical direction of a respective data item located in the stochastic screening dither matrix T, respectively;
    parameters a, b and c are three positive integers which are prime to each other, and take values satisfying the corresponding $t_i \in [0,255]$, wherein $i = v \times L + u$.

5. The method according to claim 4, characterized in that the parameters a, b and c are obtained by using a formula $Tr_n = Tr_{n-1} + Tr_{n-2} + Tr_{n-3}$ ($n>2$), wherein $Tr_0=0$, $Tr_1=1$ and $Tr_2=1$.

6. The method according to claim 1, characterized in that the step of generating the screen dot dither contrast matrix $CT_j$ for each color surface of the n color surfaces of the image according to the difference value $rt_i$ and the stochastic screening dither threshold $F_j$ set for each color surface includes:
    for each color surface j of the image, if the replaced value $rt_i$ of the data item i in the stochastic screening dither matrix T satisfies $rt_i<0$ and $(rt_i+\delta)<F_j$, setting a value of a data item at a corresponding position in the screen dot dither contrast matrix $CT_j$ to be 1, otherwise setting the value of the data item at the corresponding position in the screen dot dither contrast matrix $CT_j$ to be 0.

7. The method according to claim 1, characterized in that the step of performing the logical "and" operation between each data item in the one-bit amplitude modulation screen dot matrix of each color surface of the image and the data item at the corresponding position in the screen dot dither contrast matrix $CT_j$ of the color surface includes:
    for each color surface j, tiling the screen dot dither contrast matrix $CT_j$ of the color surface one by one, so that length and width of a tiled matrix $SCT_j$ obtained after being tiled are larger than those of the one-bit amplitude modulation screen dot matrix of the color surface, respectively;
    selecting an arbitrary part with a length and a width equivalent to those of the one-bit amplitude modulation screen dot matrix from the tiled matrix $SCT_j$ as a contrast matrix $CSCT_j$; and
    performing a logical "and" operation between each data item in the one-bit amplitude modulation screen dot matrix and a data item at a corresponding position in the contrast matrix $CSCT_j$.

8. An image processing apparatus applied to printer screening plate-making technology, characterized in that the apparatus includes:
    a first matrix generating unit, used for generating a stochastic screening dither matrix T; a value of each data item i in the stochastic screening dither matrix T being $t_i$, and $t_i \in [0,255]$, $i \in [0, W_T-1]$, wherein $W_T$ is the number of data items in the stochastic screening dither matrix T;
    a conversion unit, used for subtracting $\delta$ from the value $t_i$ of each data item i in the stochastic screening dither matrix T, to obtain a difference value $rt_i$ corresponding to each data item i, and $\delta \in [0,255]$, and replacing the original value $t_i$ of each data item i with the difference value $rt_i$;

a threshold setting unit, used for setting a stochastic screening dither threshold $F_j$ for each color surface of n color surfaces of an image, wherein $F_j \in [0,127]$, $j \in [1,n]$;

a second matrix generating unit, used for generating a screen dot dither contrast matrix $CT_j$ for each color surface according to the $F_j$ and the replaced value $rt_i$; and a processing unit, used for performing a logical "and" operation between each data item in a one-bit amplitude modulation screen dot matrix of each color surface of the image and a data item at a corresponding position in the screen dot dither contrast matrix $CT_j$ of the color surface respectively, and replacing a value of a corresponding data item in the one-bit amplitude modulation screen dot matrix with a resultant value of the logical "and" operation, to obtain a processed one-bit amplitude modulation screen dot matrix for each color surface of the image.

9. The apparatus according to claim 8, characterized in that the first matrix generating unit includes:

a matrix generating subunit, used for using a formula $T=(a \times u + b \times v) \bmod(c)$ to generate the stochastic screening dither matrix T, wherein, u and v denote a coordinate in horizontal direction and a coordinate in vertical direction of a respective data item located in the stochastic screening dither matrix T, respectively; parameters a, b and c are three positive integers which are prime to each other, and take values satisfying the corresponding $t_i \in [0, 255]$, wherein $i = v \times L + u$, and L is a side length of the stochastic screening dither matrix T; and a parameter calculation subunit, used for using a formula $Tr_n = Tr_{n-1} + Tr_{n-2} + Tr_{n-3}(n>2)$ to calculate to obtain the parameters a, b and c, wherein $Tr_0=0$, $Tr_1=1$, $Tr_2=1$.

10. The apparatus according to claim 8, characterized in that the processing unit includes:

a tiling subunit, used for tiling the screen dot dither contrast matrix $CT_j$ of one color surface one by one, so that length and width of a tiled matrix $SCT_j$ obtained after being tiled are larger than those of the one-bit amplitude modulation screen dot matrix of the color surface, respectively;

a selection subunit, used for selecting an arbitrary part with a length and a width equivalent to those of the one-bit amplitude modulation screen dot matrix from the tiled matrix $SCT_j$ as a contrast matrix $CSCT_j$; and a processing subunit, used for performing a logical "and" operation between each data item in the one-bit amplitude modulation screen dot matrix and a data item at a corresponding position in the contrast matrix $CSCT_j$, and replacing a value of a corresponding data item in the one-bit amplitude modulation screen dot matrix with a resultant value of the logical "and" operation.

* * * * *

UNITED STATES PATENT AND TRADEMARK OFFICE
CERTIFICATE OF CORRECTION

PATENT NO.       : 8,462,390 B2  
APPLICATION NO. : 13/124708  
DATED            : June 11, 2013  
INVENTOR(S)      : Li et al.

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 255 days.

Signed and Sealed this
Eighth Day of September, 2015

Michelle K. Lee
*Director of the United States Patent and Trademark Office*